United States Patent [19]

Sasaki et al.

[11] Patent Number: 4,806,433
[45] Date of Patent: * Feb. 21, 1989

[54] PROCESS FOR PRODUCING OLEFIN POLYMER

[75] Inventors: Toshio Sasaki; Takeshi Ebera, both of Ichihara; Kiyoshi Kawai, Chiba; Akinobu Shiga, Ichihara, all of Japan

[73] Assignee: Sumitomo Chemical Company, Limited, Osaka, Japan

[*] Notice: The portion of the term of this patent subsequent to Jun. 9, 2004 has been disclaimed.

[21] Appl. No.: 48,615

[22] Filed: May 11, 1987

[30] Foreign Application Priority Data

May 15, 1986 [JP]  Japan ................. 61-111680

[51] Int. Cl.[4] .............................. C08F 4/64
[52] U.S. Cl. .................... 502/115; 502/116; 502/120; 502/125; 502/126; 502/127; 526/118
[58] Field of Search ............... 502/115, 116, 120, 125, 502/126, 127

[56] References Cited

U.S. PATENT DOCUMENTS

| | | | |
|---|---|---|---|
| 3,135,809 | 6/1964 | Bosmajian | 502/103 X |
| 3,705,886 | 12/1972 | Kashiwa et al. | 260/85.3 |
| 3,917,575 | 11/1975 | Matsuura et al. | 260/88.2 |
| 4,350,802 | 9/1982 | Baba et al. | 502/115 |
| 4,380,508 | 4/1983 | Shipley et al. | 502/115 |
| 4,402,861 | 9/1983 | Hoff | 502/115 |
| 4,455,497 | 11/1985 | Coleman et al. | 502/115 |
| 4,461,882 | 7/1984 | Welch et al. | 526/119 |
| 4,495,338 | 1/1985 | Mayr et al. | 526/125 |
| 4,613,579 | 9/1986 | Furuhashi et al. | 502/115 |
| 4,672,050 | 6/1987 | Sasari et al. | 502/116 |

FOREIGN PATENT DOCUMENTS

| | | |
|---|---|---|
| 921014 | 2/1973 | Canada . |
| 0017471 | 10/1980 | European Pat. Off. . |
| 0111903 | 6/1984 | European Pat. Off. . |
| 0206817 | 12/1986 | European Pat. Off. . |
| 2265768 | 10/1975 | France . |
| 50-39470 | 12/1975 | Japan . |
| 56-15302 | 10/1981 | Japan . |
| 1309303 | 3/1973 | United Kingdom . |
| 1343781 | 1/1974 | United Kingdom . |

OTHER PUBLICATIONS

Chemical Abstracts, vol. 92, No. 4, Jan. 1980, p. 27, Abstract No. 23183a.
Karol, Catal. Rev.-Sci. Eng. 26, (1984) pp. 557, 560 and 561.

*Primary Examiner*—Patrick P. Garvin
*Attorney, Agent, or Firm*—Stevens, Davis, Miller & Mosher

[57] ABSTRACT

A solid catalyst component containing a trivalent titanium compound, obtained by reducing a titanium compound represented by the general formula Ti(OR$^1$)$_n$X$_{4-n}$ (wherein R$^1$ is a hydrocarbon group of 1 to 20 carbon atoms, X is a halogen atom, and n is a number satisfying $0<n\leq4$) with an organomagnesium compound in the presence of an alcohol compound and/or a phenol compound to obtain a solid product and then treating the solid product with a mixture of an ether compound and titanium tetrachloride; a catalyst system comprising:

(A) said solid catalyst component, and
(B) an organoaluminum compound; and a process for producing an olefin polymer, which comprises homopolymerizing an olefin or copolymerizing olefins using said catalyst system.

23 Claims, 1 Drawing Sheet

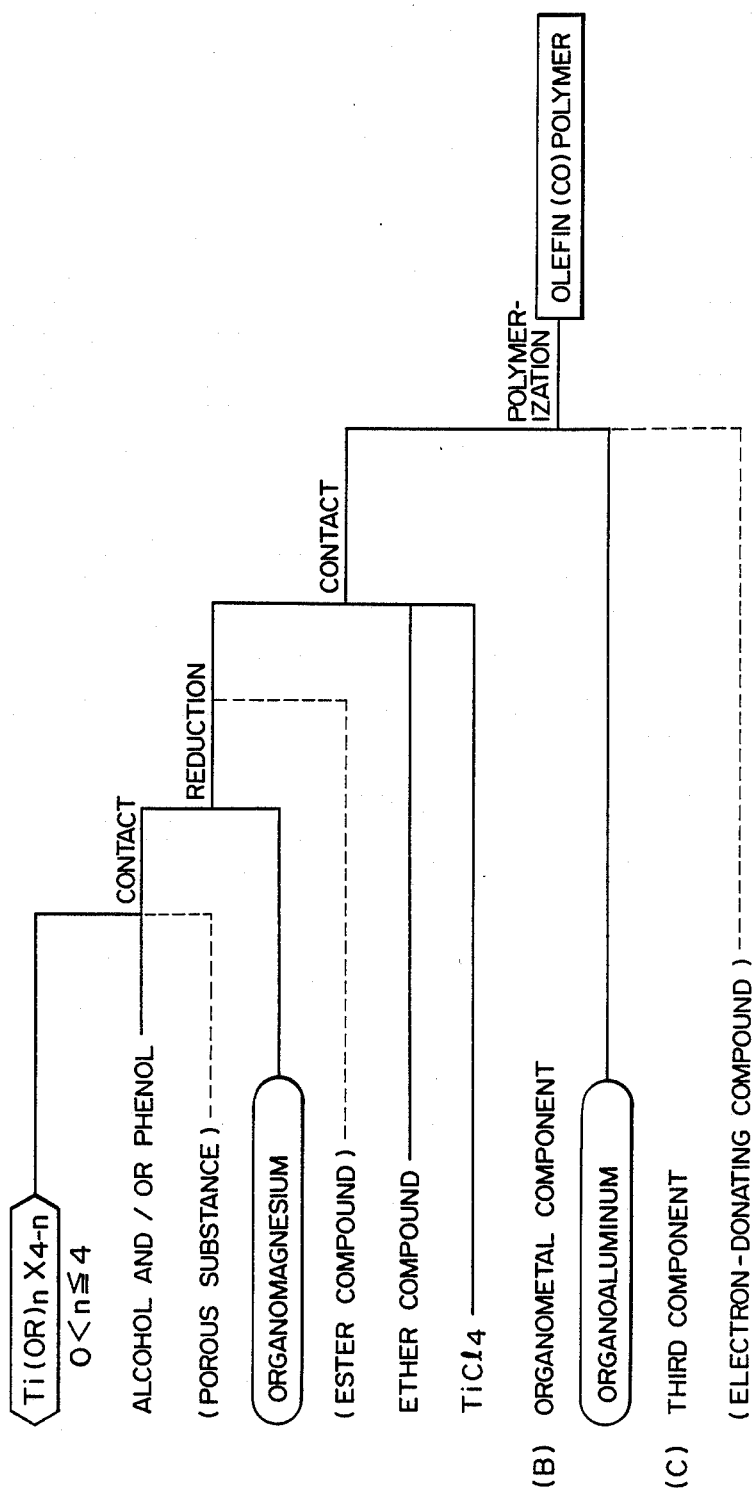

PROCESS FOR PRODUCING OLEFIN POLYMER

BACKGROUND OF THE INVENTION

1. Field of the Invention

The present invention relates to a solid catalyst component having high activity, a catalyst system for olefin polymerization using said solid catalyst component, and a process for producing an olefin polymer using said catalyst system. More particularly, the present invention relates to a process for producing an olefin polymer using a catalyst system containing a solid catalyst component whose activity is very high not only per transition metal but also per soid catalyst component in various polymerization processes such as slurry polymerization, bulk polymerization, gas phase polymerization, high temperature solution polymerization, high pressure ionic polymerization and the like.

2. Description of the Prior Art

Solid catalysts of high activity used for production of olefin polymer have a very high industrial value because use of such catalysts requires no removal of catalyst residue from the olefin polymer produced and can simplify the process of olefin polymer production. Importantly, their activities must be high not only per transition metal but also per solid catalyst.

When a metal halide compound such as a titanium halide compound, a magnesium halide compound or the like is used in a solid catalyst, the compound is desired to have a sufficiently high activity per solid catalyst for the prevention of corrosion of equipment and apparatus due to active halogen.

In recent years, solid catalysts comprising (a) a transition metal compound such as titanium tetrachloride or the like and (b) a carrier such as magnesium compound have been extensively developed. Many of these catalysts, however, are not satisfactory in activity per solid catalyst (see Belgium Patent No. 759601, Japanese Patent Publication No. 46269/1972, Japanese Patent Publication No. 26383/1972, etc.).

As the solid catalyst component obtained by reducing a titanium compound with an organomagnesium, there are proposed those comprising (a) a Grignard reagent and (b) titanium tetrachloride or an alkoxy-containing titanium halide [see Japanese Patent Application Kokai (Laid-Open) No. 4391/1971, Japanese Patent Publication No. 40959/1972, Japanese Patent Publication No. 39470/1975 and Japanese Patent Publication No. 30102/1975], as well as those obtained by reacting a Grignard reagent and an alkoxy-containing titanium halide compound and then treating the resulting reaction product with titanium tetrachloride see Japanese Patent Publication No. 24361/1982 and Japanese Patent Application Kokai (Laid-Open) No. 115302/1981]. These solid catalyst components, however, are insufficient in activities per transition metal and per solid catalyst component.

SUMMARY OF THE INVENTION

Under such circumstances, it is the first object of the present invention to provide a solid catalyst component for production of olefin polymer whose activities per transition metal and per solid catalyst component are high enough to require no removal of catalyst residue. The second object of the present invention is to provide a catalyst system using said solid catalyst component and an organoaluminum compound, and the third object of the present invention is to provide a process for producing an olefin polymer using said catalyst system.

According to the present invention, there are provided a solid catalyst component containing a trivalent titanium compound, obtained by reducing a titanium compound represented by the general formula Ti(OR$^1$)$_n$X$_{4-n}$ (wherein R$^1$ is a hydrocarbon group of 1 to 20 carbon atoms, X is a halogen atom, and n is a number satisfying $0<n\leq 4$) with an organomagnesium compound in the presence of an alcohol compound and/or a phenol compound to obtain a solid product and then treating the solid product with a mixture of an ether compound and titanium tetrachloride; a catalyst system comprising said solid catalyst component and an organoaluminum compound; and a process for producing an olefin polymer using said catalyst system.

BRIEF EXPLANATION OF THE DRAWING

The accompanying drawing is a flow chart helpful for easy understanding of the present invention.

This flow chart illustrates a typical embodiment of the present invention and in no way restricts the present invention.

DETAILED DESCRIPTION OF THE INVENTION

The present invention will be explained specifically below.

(a) Titanium compound

The titanium compound used in the present invention is represented by the general formula Ti(OR$^1$)$_n$X$_{4-n}$ (wherein R$^1$ is a hydrocarbon group of 1 to 20 carbon atoms, X is a halogen atom, and n is a number satisfying $0<n\leq 4$). As specific examples of the R$^1$, there can be mentioned alkyl groups such as methyl, ethyl, n-propyl, isopropyl, n-butyl, isobutyl, n-amyl, isoamyl, n-hexyl, n-heptyl, n-octyl, n-decyl, n-dodecyl and the like; aryl groups such as phenyl, cresyl, xylyl, naphthyl and the like; cycloalkyl groups such as cyclohexyl, cyclopentyl and the like; alkenyl groups such as propenyl and the like; and aralkyl groups such as benzyl and the like.

Alkyl groups of 2 to 18 carbon atoms and aryl groups of 6 to 18 carbon atoms are preferred. Straight chain alkyl groups of 2 to 18 carbon atoms are particularly preferred.

It is possible to use a titanium compound of at least two different OR$^1$ groups.

As the halogen atom represented by the X, there can be mentioned chlorine, bromine, iodine, etc. In particular, chlorine gives a preferable result.

The n of the titanium compound represented by the general formula Ti(OR$^1$)$_n$X$_{4-n}$ is a number satisfying $0<n\leq 4$, preferably a number satisfying $2\leq n\leq 4$, particularly 4.

For synthesis of a titanium compound represented by the general formula Ti(OR$^1$)$_n$X$_{4-n}$ ($0<n\leq 4$), there can be used known methods. There can be used, for example, a method of reacting Ti(OR$^1$)$_4$ and TiX$_4$ in predetermined proportions and a method of reacting TiX$_4$ and a corresponding alcohol in predetermined proportions.

(b) Alcohol and phenol

In synthesys of the solid catalyst component (A) of the present invention, an alcohol of 2 to 15 carbon atoms or a phenol of 6 to 25 carbon atoms is used.

Specific examples of the alcohol include saturated aliphatic alcohols such as methanol, ethanol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, heptyl alcohol, octyl alcohol, capryl alcohol, nonyl alcohol, decyl alcohol and the like; unsaturated aliphatic alcohols such as allyl alcohol, crotyl alcohol, propargyl alcohol and the like; alicyclic alcohols such as cyclopentanol, cyclohexanol and the like; and aromatic alcohols such as benzyl alcohol, methylbenzyl alcohol, ethylbenzyl alcohol, n-propylbenzyl alcohol, isopropylbenzyl alcohol, dimethylbenzyl alcohol, diethylbenzyl alcohol, di-n-propylbenzyl alcohol and the like.

Specific examples of the phenol include phenol, o-cresol, m-cresol, p-cresol, 2,3-xylenol, 2,4-xylenol, 2,5-xylenol, 2,6-xylenol, 3,4-xylenol, 3,5-xylenol carvacrol, thymol, alpha-naphthol, beta-naphthol, etc.

Preferable of these are aliphatic alcohols of 1 to 4 carbon atoms and phenols of 6 to 10 carbon atoms.

(c) Organomagnesium compound

The organomagnesium compound used in the present invention can be any organomagnesium compound having at least one magnesium-carbon bond. Particularly, Grignard compounds represented by the general formula $R^9MgX$ (wherein $R^9$ is a hydrocarbon group of 1 to 20 carbon atoms and X is a halogen atom) and dialkyl- or diarylmagnesium compounds represented by the general formula $R^{10}R^{11}Mg$ (wherein $R^{10}$ and $R^{11}$ are each a hydrocarbon group of 1 to 20 carbon atoms) are used preferably. $R^9$, $R^{10}$ and $R^{11}$ may be same or different and are each an alkyl, aryl, aralkyl or alkenyl group such as methyl, ethyl, n-propyl, isopropyl, n-butyl, sec-butyl, tertbutyl, n-amyl, isoamyl, n-hexyl, n-octyl, 2-ethylhexyl, phenyl, benzyl or the like.

As specific examples of the Grignard compounds, there can be mentioned methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, isoamylmagnesium chloride, phenylmagnesium chloride and phenylmagnesium bromide. As specific examples of the compounds represented by the general formula $R^{10}R^{11}Mg$, there can be mentioned diethylmagnesium, di-n-propylmagnesium, diisopropylmagnesium, di-n-butylmagnesium, di-sec-butylmagnesium, di-tert-butylmagnesium, n-butyl-sec-butylmagnesium, di-n-amylmagnesium and diphenylmagnesium.

In synthesis of the above-mentioned organomagnesium compound, there can be used an ether solvent such as diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetol, anisole, tetrahydrofuran, tetrahydropyran or the like. Alternately, there can be used a hydrocarbon solvent such as hexane, heptane, octane, cyclohexane, methylcyclohexane, benzene, toluene, xylene or the like, or a mixture of an ether solvent and a hydrocarbon solvent. It is preferable that the organomagnesium compound be used as an ether solution. As this ether, there is used an ether compound having at least 6 carbon atoms in the molecule, or an ether compound having a ring structure.

It is particularly preferable from the standpoint of catalyst capability that a Grignard compound represented by $R^9MgCl$ be used as an ether solution.

In place of the organomagnesium compound, it is possible to use a hydrocarbon-soluble complex between one of the above organomagnesium compounds and an organometal compound. As examples of the organometal compound, there can be mentioned those of Li, Be, B, Al or Zn.

(d) Ether compound

As the ether compound used in the present invention, dialkyl ethers such as diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether and ethyl isobutyl ether are preferred.

Of these dialkyl ethers, di-n-butyl ether and diisoamyl ether are particularly preferred.

(e) Synthesis of solid catalyst component (A)

The solid catalyst component (A) of the present invention is synthesized by reducing a titanium compound represented by the general formula $Ti(OR^1)_nX_{4-n}$ with an organomagnesium compound in the presence of an alcohol compound and/or a phenol compound to obtain a solid product and then treating the solid product with a mixture of an ether compound and titanium tetrachloride.

All the procedures of the above synthesis are conducted in an inert gas atmosphere such as nitrogen, argon or the like.

The reduction of the titanium compound with the organomagnesium compound can be effected by adding the organomagnesium compound to a mixture of the titanium compound and the alcohol compound and/or the phenol compound, or by adding the mixture to a solution of the organomagnesium compound.

It is preferred that the titanium compound and the alcohol compound and/or the phenol compound is used as a solution or dilution in an appropriate solvent.

As such a solvent, there can be mentioned aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; and ether compounds such as diethyl ether, dibutyl ether, diisoamyl ether, tetrahydrofuran and the like.

The reduction temperature is $-50°$ to $70°$ C., preferably $-30°$ to $50°$ C., particularly preferably $-25°$ to $35°$ C.

The dropping time has no particular restriction but ordinarily is about 30 minutes to 6 hours. After the completion of the reduction, a post-reaction may be effected at a temperature of $20°$ to $120°$ C.

The amount of alcohol compound and/or phenol compound used is 0.5 to 50, preferably 1 to 30, particularly preferably 3 to 25 in terms of the molar ratio of hydroxyl group to titanium atom in titanium compound.

The amount of organomagnesium compound used is 0.1 to 10, preferably 0.2 to 5.0, particularly preferably 0.5 to 2.0 in terms of the molar ratio of the sum of titanium atom and hydroxyl group to magnesium atom.

In the reduction to obtain a solid product, it is possible to allow a porous substance (e.g. silica gel, alumina, porous polymer) to coexist so as to be impregnated with the solid product. As such a porous substance, there is preferred silica gel and alumina which are spherical, have particle diameters of 10 to 200 μm and a pore volume of at least 0.5 ml/g.

The solid product obtained by the reduction is subjected to a solid-liquid separation procedure and then washed several times with an inert hydrocarbon solvent such as hexane, heptane or the like.

The thus obtained solid product is then treated with a mixture of an ether compound and titanium tetra-chloride.

The treatment of the solid product with the mixture of the ether compound and titanium tetrachloride is conducted preferably in a slurry state. As the solvent used in slurry formation, there can be mentioned aliphatic hydrocarbons such as pentane, hexane, heptane, octane, decane and the like; aromatic hydrocarbons such as toluene, xylene and the like; alicyclic hydrocarbons such as cyclohexane, methylcyclohexane, decalin and the like; and halogenated hydrocarbons such as dichloroethane, trichloroethane, trichloroethylene, monochlorobenzene, dichlorobenzene, trichlorobenzene and the like.

The slurry concentration is preferably 0.05 to 0 5 g solid/ml solvent, particularly preferably 0.1 to 0.3 g solid/ml solvent.

The treatment temperature is 30° to 150° C., preferably 45° to 120° C., particularly preferably 60° to 100° C.

The treatment time has no particular restriction but ordinarily is preferred to be 30 minutes to 6 hours.

Mixing of the solid product, the ether compound and titanium tetrachloride can be conducted by a method of adding the ether compound and titanium tetrachloride to the solid product, or by a method of adding the solid product to a solution of the ether compound and titanium tetrachloride.

The method of adding the ether compound and titanium tetrachloride to the solid porduct is conducted by adding the ether compound and titanium tetrachloride in this order to the solid product, or preferably by adding the ether compound and titanium tetrachloride simultaneously to the solid product, or more preferably by adding a premix of the ether compound and titanium tetrachloride to the solid product.

The treatment of the solid product with the ether compound and titanium tetrachloride may be conducted two times or more.

The amount of ether compound used is 0.1 to 100 moles, preferably 0.5 to 50 moles, particularly preferably 1 to 20 moles per mole of titanium atom in solid product.

The amount of titanium tetrachloride used is 1 to 1000 moles, preferably 3 to 500 moles, particularly preferably 10 to 300 moles per mole of titanium atom in solid product. The amount of titanium tetrachloride used per mole of ether compound is 1 to 100 moles, preferably 1.5 to 75 moles, particularly preferably 2 to 50 moles.

The thus obtained solid catalyst component containing a trivalent titanium compound is subjected to a solid-liquid separation procedure, then washed with an inert hydrocarbon solvent such as hexane, heptane or the like several times, and subsequently used for olefin polymerization.

The washing of the solid catalyst component after solid-liquid separation procedure may also be conducted by washing of at least one time at 50° to 120° C. with an excessive amount of an aromatic hydrocarbon (e.g. toluene, xylene) or a halogenated hydrocarbon solvent (e.g. monochlorobenzene) followed by washing of several times with an aliphatic hydrocarbon solvent (e.g. hexane).

In order to improve the stereoregularity of polymer produced, it is also possible to add a known ester compound prior to or during the treatment of the solid product with the mixture of the ether compound and titanium tetrachloride. Such an ester compound is a mono- or polycarboxylic acid ester such as aliphatic carboxylic acid ester, olefinic carboxylic acid ester, alicyclic carboxylic acid ester, aromatic carboxylic acid ester or the like.

As specific examples of the ester compound, there can be mentioned methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate and diphenyl phthalate.

Preferable of these ester compounds are olefinic carboxylic acid esters such as methacrylic acid ester, maleic acid ester and the like; aromatic carboxylic acid esters such as benzoic acid ester and the like; and phthalic acid esters.

The amount of ester compound used is 0.1 to 50 moles, preferably 0.3 to 20 moles, particularly preferably 0.5 to 10 moles per mole of titanium atom in solid product.

Further, the amount of ester compound used is 0.01 to 1.0 mole, preferably 0.03 to 0.5 mole per mole of magnesium atom in solid product.

(f) Organoaluminum compound (B)

The organoaluminum compound (B) used in the present invention together with the above mentioned solid catalyst component (A) has at least one Al-C bond in the molecule. Typical of the organoaluminum compound are represented by the following general formulas

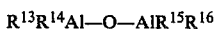

(wherein $R^{12}$, $R^{13}$, $R^{14}$, $R^{15}$ and $R^{16}$ are each a hydrocarbon group of 1 to 8 carbon atoms; Y is a halogen atom, a hydrogen atom or an alkoxy group; and Y is a number satisfying $2 \leq \gamma \leq 3$).

Specific examples of the organoaluminum compound include trialkylaluminums such as triethylaluminum, triisobutylaluminum, trihexylaluminum and the like; dialkylaluminum hydrides such as diethylaluminum hydride, diisobutylalminum hydride and the like; dialkylalunimum halides such as diethylalumimum chloride and the like; mixtures of a trialkylaluminum and a dialkylalunimum halide; and alkylalumoxanes such as tetraethyldialumoxane, tetrabutyldialumoxane and the like.

Preferable of these organoaluminum compounds are trialkylaluminums, mixtures of a trialkylaluminum and a dialkylaluminum halide, and alkylalumoxanes. Particularly preferable are triethylaluminum, triisobutylaluminum, a mixture of triethylaluminum and diethylaluminum chloride, and tetraethyldialumoxane.

The amount of organoaluminum compound used can vary widely from 1 to 1000 moles per mole of titanium atom in solid catalyst component. The amount is preferably 5 to 600 moles on the same basis.

(g) Process for olefin polymerization

Charging of the catalyst components (A) and (B) into a polymerization vessel has no particular restriction except that they are charged in a water-free state in an inert gas such as nitrogen, argon or the like.

The catalyst components (A) and (B) can be charged separately, or they can be contacted with each other before charging.

The polymerization can be conducted at −30° to 200° C.

The polymerization pressure has no particular restriction but it is preferably about 3 to 100 atm from industrial and economical standpoints. The polymerization can be continuous or batchwise. It can be slurry polymerization using an inert hydrocarbon solvent such as propane, butane, pentane, hexane, heptane, octane or the like, or liquid phase polymerization using no solvent, or gas phase polymerization.

Olefins to which the process of the present invention can be applied are those of at least 2 carbon atoms. Specific examples of such olefins include ethylene, propylene, butene-1, pentene-1, hexene-1, 3-methyl-pentene-1 and 4-methyl-pentene-1. However, the present process is in no way restricted to these olefins. The polymerization of the present invention can be homo-polymerization or copolymerization. In the copolymerization, at least two olefins in a mixed state are contacted with the catalyst components (A) and (B), whereby a copolymer can be obtained.

Also, heteroblock copolymerization wherein polymerization is conducted in two or more stages can easily be conducted according to the present process.

In the polymerization of the present invention, it is also possible to add a chain transfer agent such as hydrogen or the like to control the molecular weight of polymer produced.

In order to improve or control the stereoregularity and molecular weight of polymer produced, it is further possible to add to the polymerization system a known electron-donating compound as a third component. As such an electron-donating compound, there can be mentioned, for example, organic carboxylic acid esters such as methyl methacrylate, methyl toluate and the like; phosphorous acid esters such as triphenyl phosphite and the like; and silicic acid esters such as tetraethoxysilane, phenyltriethoxysilane and the like.

Of these, silicic acid ester compounds and benzoic acid ester compounds are preferable. The silicic acid ester compounds are particularly preferable.

Specific examples of the silicic acid ester compounds include tetramethoxysilane, methyltrimethoxysilane, dimethyldimethoxysilane, ethyltrimethoxysilane, phenyltrimethoxysilane, phenylmethyldimethoxysilane, tetraethoxysilane, methyltriethoxysilane, ethyltriethoxysilane; vinyltriethoxysilane, phenyltriethoxysilane, diphenyldimethoxysilane, diphenyldiethoxysilane, butyltriethoxysilane, tetrabutoxysilane, vinyltributoxysilane and diethyldiethoxysilane.

The amount of electron-donating compound used is 0.01 to 5 moles, preferably 0.03 to 3 moles, particularly preferably 0.05 to 1 mole per mole of organoaluminum compound which is the catalyst component (B) of the present invention.

The present invention will be explained in more detail by way of Examples and Comparative Examples. However, the present invention is in no way restricted to these Examples.

EXAMPLE 1

(A) Synthesis of organomagnesium compound

A 1-l flask equipped with a stirrer, a reflux condenser, a dropping funnel and a thermometer was purged with argon. Therein was placed 32.0 g of chipped magnesium for Grignard reagent. 120 g of n-butyl chloride and 500 ml of di-n-butyl ether were placed in the dropping funnel and about 30 ml of this mixture was dropped into the flask to start a reaction. In 4 hours after the start of the reaction, the remainder of the mixture was dropped at 50° C. After the dropping, the reaction was continued for a further 1 hour at 60° C. Then, the reaction mixture was cooled to room temperature and the solid portion was removed by filtration.

The resulting n-butylmagnesium chloride in di-n-butyl ether was hydrolyzed with 1 N sulfuric acid and then back titration was conducted with 1 N aqueous sodium hydroxide solution using phenolphthalein as an indicator to determine the concentration of n-butylmagnesium chloride. The concentration was 2.2 moles/liter.

(B) Synthesis of solid product

A flask having an internal volume of 300 ml, equipped with a stirrer and a dropping funnel was purged with argon. Therein were placed 100 ml of n-heptane, 2,5 g (7.4 mmol) of tetrabutoxytitanium and 13.0 g (140 mmol) of phenol. Then, 66.7 ml of the organomagnesium compound synthesized in the above (A) was dropped from the dropping funnel in 2 hours while keeping the temperature of content in the flask at 5° C. After the dropping, stirring was continued for 1 hour at room temperature. The reaction mixture was subjected to a solid-liquid separation procedure. The solid portion was washed with 100 ml of n-heptane three times and then vacuum-dried to obtain 32.0 g of a grayish white solid product.

(C) Synthesis of solid catalyst component

A flask having an internal volume of 100 ml was purged with argon. Therein were placed 4.7 g of the solid product synthesized by the reduction in the above (B), 25 ml of monochlorobenzene and 1.2 ml (4.5 mmol) of diisobutyl phthalate. They were subjected to a reaction for 1 hour at 80° C.

After the reaction, the reaction mixture was subjected to a solid-liquid separation procedure. The solid portion was washed with 30 ml of n-heptane three times.

In the flask after the washing were placed 25 ml of monochlorobenzene, 1.6 ml (9.5 mmol) of n-butyl ether and 28 ml (250 mmol) of titanium tetrachloride. The resulting mixture was subjected to a reaction for 3 hours at 80° C. After the reaction, the reaction mixture was subjected to a solid-liquid separation procedure at 80° C. The solid portion was washed with 30 ml of monochlorobenzene twice.

The above treatment with the mixture of n-butyl ether and titanium tetrachloride was repeated once more under the same conditions. Then, washing with 30 ml of n-heptane was conducted twice followed by vacuum drying, whereby 2.4 g of a solid catalyst component of orangish white color was obtained.

The solid catalyst component contained 1.3% by weight of titanium atom and 12.9% by weight of phthalic acid esters.

(D) Polymerization of propylene

A stainless steel autoclave having an internal volume of 130 ml and of magnetic stirrer mixing type was purged with argon. Therein were placed 0.57 mmol of triethylaluminum, 0.057 mmol of phenyltriethoxysilane, 7.2 mg of the solid catalyst component prepared in the above. (C) and 80 ml of liquefied propylene.

The mixture was stirred for 1 hour at 60° C. Excessive propylene was released and the polypropylene produced was air-dried for 24 hours. The polypropylene after air-drying weighed 15.1 g.

Therefore, the yield (g) of polypropylene per g of solid catalyst component (this yield is hereinafter abbreviated to PP/cat) was 2,090. The yield of polypropylene per titanium (this yield is hereinafter abbreviated to PP/Ti) was 161,000.

The polypropylene powder obtained was subjected to extraction with boiling n-heptane for 6 hours. In this extraction, the percentage of residue (insoluble) [hereinafter abbreviated to IY (%)] was 98.3%.

COMPARATIVE EXAMPLE 1

(A) Synthesis of solid product

A flask having an internal volume of 300 ml, equipped with a stirrer and a dropping funnel was purged with argon. Therein were placed 60 ml of n-heptane and 27.3 g (80 mmol) of tetrabutoxytitanium. Then, 36.4 ml of the organomagnesium compound synthesized in the (A) of Example 1 was dropped from the dropping funnel in 3 hours while keeping the temperature of content in the flask at 5° C. After the dropping, stirring was continued for a further 2 hours at room temperature. The reaction mixture was subjected to a solid-liquid separation procedure. The solid portion was washed with 60 ml of n-heptane three times and vacuum-dried to obtain 28.9 g of a dark green solid product.

(B) Synthesis of solid catalyst component

A solid catalyst component was synthesized in the same manner as in the (C) of Example 1 except that n-heptane was used in place of monochlorobenzene in the treatment with diisobutyl phthalate and also in the first treatment with the mixture of n-butyl ether and titanium tetrachloride.

The solid catalyst component contained 14.2% by weight of titanium atom and 1.9% by weight of phthalic acid esters.

(C) Polymerization of propylene

Propylene polymerization was conducted in the same manner as in the (D) of Example 1. PP/cat was 2,440; PP/Ti was 17,200; and IY was 80.4%. When no phenol is present, the catalyst activity per titanium and the stereoregularity of polymer produced are remarkably low, as compared with those of Example 1.

EXAMPLES 2 to 5

Solid catalyst components were synthesized in the same manner as in Example 1 except that the alcohols and phenols shown in Table 1 were used in place of phenol in the (B) of Example 1. Using these solid catalyst components, propylene polymerization was conducted in the same manner as in the (D) of Example 1. The results are shown in Table 1.

TABLE 1

|  | Alcohol and phenol | PP/cat (g/g) | PP/Ti (g/g) | IY (%) |
|---|---|---|---|---|
| Example 1 | Phenol | 2,090 | 161,000 | 98.3 |
| Example 2 | o-Cresol | 1,150 | 144,000 | 98.1 |
| Example 3 | Ethanol | 1,900 | 26,000 | 97.0 |
| Example 4 | Isopropyl alcohol | 1,100 | 47,800 | 93.8 |
| Example 5 | 2-Methyl-2-propanol | 2,360 | 19,800 | 92.9 |

EXAMPLE 6

(A) Treatment of silica gel with organomagnesium

In a flask having an internal volume of 500 ml, equipped with a dropping funnel was placed 30.0 g of silica gel (average particle diameter: 100 μm, pore volume: 1.4 ml/g, average pore radius: 100 Å). The silica gel was vacuum-dried at 100° C. for 30 minutes. Then, the inside of flask was purged with argon. 120 ml of n-butyl ether was added. The flask was equipped with a stirrer. 84 ml of the organomagnesium compound synthesized in the (A) of Example 1 was dropped from the dropping funnel in 1 hour while keeping the temperature of inside of flask at 80° C. Stirring was continued for a further 30 minutes at the same temperature. Then, the mixture was washed with 120 ml of n-butyl ether once and with 120 ml of n-heptane twice and vacuum-dried to obtain 35.3 g of an organomagnesium-treated silica gel.

(B) Synthesis of solid product supported by silica gel

A flask having an internal volume of 100 ml, equipped with a stirrer and a dropping funnel was purged with argon. Therein were placed 4.8 g of the organo-magnesium-treated silica gel obtained in the above (A), 24 ml of n-butyl ether, 0.28 g (0.82 mmol) of tetrabutoxytitanium and 1.3 g (14 mmol) of phenol. Stirring was conducted at room temperature for 45 minutes. Then, 7.4 ml of the organomagnesium compound synthesized in the (A) of Example 1 was dropped from the dropping funnel in 1 hour while keeping the temperature of content in the flask at 5° C. After the dropping, stirring was continued for 30 minutes at 5° C. and further for 1 hour at room temperature. Washing of the resulting solid was conducted with 30 ml of n-heptane three times, followed by vacuum drying to obtain 5.7 g of a grayish white solid product.

(C) Synthesis of solid catalyst component

A flask having an internal volume of 100 ml was purged with argon. Therein were placed 5.5 g of the solid product obtained in the reduction of the above (B), 28 ml of monochlorobenzene and 0.23 ml (0.86 mmol) of diisobutyl phthalate. A reaction was conducted at 80° C. for 1 hour.

After the reaction, the reaction mixture was subjected to a solid-liquid separation procedure. The solid portion in the flask was washed with 30 ml of n-heptane three times. After the washing, 28 ml of monochlorobenzene, 0.3 ml (1.8 mmol) of n-butyl ether and 5.3 ml (47 mmol) of titanium tetrachloride were added. A reaction was conducted at 80° C. for 3 hours. After the reaction, the reaction mixture was subjected to a solid-liquid separation procedure. The solid portion was washed with 30 ml of monochlorobenzene twice. The above treatment with the mixture of n-butyl ether and titanium tetrachloride was repeated once more under the same conditions. The resulting solid was washed with 30 ml of n-heptane twice and vacuum-dried to obtain 2.4 g of a solid catalyst component of orangish white color.

The solid catalyst component contained 4.2% by weight of titanium atom and 1.0% by weight of phthalic acid esters.

Using the above solid catalyst component, propylene polymerization was conducted in the same manner as in the (D) of Example 1, PP/cat was 880; PP/Ti was 21,000; and IY was 96.6%. The polymer was spherical and had a bulk density of 0.42 g/cm$^3$.

EXAMPLE 7

Propylene polymerization was conducted in the same manner as in Example 6 except that n-heptane was used in place of n-butyl ether and ethanol was used in place of phenol in the (B) of Example 6. PP/cat was 640; PP/Ti was 16,800; and IY was 94.5%. The polymer had a bulk density of 0.43 g/cm$^3$.

EXAMPLE 8

(A) Synthesis of solid catalyst component

A solid catalyst component was synthesized in the same manner as in Example 3 except that the treatment with diisobutyl phthalate conducted in the synthesis of the solid catalyst component of Example 3 was omitted. The solid catalyst component contained 4.4% by weight of titanium atom.

(B) Polymerization of ethylene

A 0.4 l autoclave equipped with a stirrer was thoroughly purged with argon. Thereinto was charged 90 g of butane. The temperature of autoclave was elevated to 60° C. Ethylene was added to a partial pressure of 6 kg/cm$^2$ (a total pressure of 15 kg/cm$^2$). Further, 4.9 mg of the solid catalyst component obtained in the above (A) and 1 mmol of triethylaluminum were added, and polymerization was started. The polymerization was effected at 60° C. for 1 hour while continuously supplying ethylene to keep the total pressure constant. After the polymerization, the polymer formed was collected by filtration and vacuum-dried at 60° C. The catalyst activity was 107,000 g polymer/g titanium.

COMPARATIVE EXAMPLE 2

(A) Synthesis of solid product

A solid product was synthesized in the same manner as in the (A) of Comparative Example 1.

(B) Synthesis of solid catalyst component

A solid catalyst component was synthesized in the same manner as in the (C) of Example 1 except that the treatment with diisobutyl phthalate was omitted. The solid catalyst component contained 18.6% by weight of titanium atom.

(C) Polymerization of ethylene

Ethylene polymerization was conducted in the same manner as in the (B) of Example 8. The catalyst activity was 38,300 g polymer/g titanium. When no ethanol is present, the catalyst activity per titanium is remarkably low, as compared with Example 8.

As appreciated from the foregoing, the catalyst system of the present invention, having very high activities per solid catalyst and per titanium atom, enables production of an olefin polymer whose halogen and titanium contents (these contents have a close connection to the coloring, stability and corrosive property of the polymer) are very low, with no special procedure required for removal of catalyst residue. Hence, the catalyst system of the present invention needs no facility for removal of catalyst residue and can reduce the production cost of polymer produced.

What is claimed is:

1. A solid catalyst component containing a trivalent titanium compound, obtained by reducing a titanium compound represented by the general formula Ti(OR$^1$)$_n$X$_{4-n}$ (wherein R$^1$ is a hydrocarbon group of 1 to 20 carbon atoms, X is a halogen atom, and n is a number satisfying $0 < n \leq 4$) with an organomagnesium compound in the presence of an alcohol of 2 to 15 carbon atoms and/or a phenol of 6 to 15 carbon atoms to obtain a solid product and then treating the solid product with a mixture of dialkyl ether and titanium tetrachloroide.

2. A solid catalyst component according to claim 1, wherein the hydrocarbon group R$^1$ of the titanium compound represented by the general formula Ti(OR$^1$)$_n$X$_{4-n}$ is salkyl groups of 2 to 18 carbon atoms and/or aryl groups of 6 to 18 atoms.

3. A solid catalyst component according to claim 1, wherein the X of the tiatanium compound represented by the general formula Ti(OR$^1$)$_n$X$_{4-n}$ is chlorine.

4. A solid catalyst component according to claim 1, wherein the n of the titanium compound represented by the general formula Ti(OR$^1$)$_n$X$_{4-n}$ is a number satisfying $2 \leq n \leq 4$.

5. A solid catalyst component according to claim 1, wherein the organomagnesium compound is a Grignard compound represented by the general formula R$^9$MgX (wherein R$^9$ is a hydrocarbon group of 1 to 20 carbon atoms and X is a halogen atom), or a dialkyl magnesium compound or a diaryl magnesium compound both represented by the genreal formula R$^{10}$R$^{11}$Mg (wherein R$^{10}$ and R$^{11}$ are each a hydrocarbon group of 1 to 20 carbon atoms).

6. A solid catalyst component according to claim 1, wherein the organomagnesium compound is used in an amount of 0.1 to 10 in terms of the molar ratio of the sum of titanium atom and hydroxyl group to magnesium atom.

7. A solid catalyst component according to claim 1, wherein the alcohol and/or the phenol are used in an amount of 0.5–50 in terms of the molar ratio of hydroxyl group to titanium atom in titanium compound.

8. A solid catalyst component according to claim 1, wherein the reduction is conducted at a temperature of −50° to 70° C.

9. A solid catalyst component according to claim 1, wherein the dialkyl ether is used in an amount of 0.1 to 100 moles per 1 mole of titanium atom in solid product.

10. A solid catalyst component according to claim 1, wherein titanium tetrachloride is used in an amount of 1 to 1,000 moles per 1 mole of titanium atom in solid product and in an amount of 1 to 100 moles per 1 mole of alkalyl ether.

11. A solid catalyst component according to claim 1, wherein the solid product is treated with a mixture of the dialkyl ether and titanium tetrachloride in a slurry state using a solvent.

12. A solid catalyst component according to claim 11, wherein the solvent is an aliphatic or aromatic hydrocarbon, alicyclic hydrocarbon, or a halogenated hydrocarbon.

13. A solid catalyst component according to claim 1, wherein a mono- or polycarboxylic acid ester is added prior to or during the treatment of the solid product with the mixture of the dialkyl ether and titanium tetrachloride.

14. A solid catalyst component according to claim 1 or 13, wherein a porous substance is coexisted in the reduction to obtain a solid product.

15. A solid catalyst component according to claim 14, wherein the porous substances are silica gel, alumina or porous polymer.

16. A catalyst system for olefin polymerization comprising:
(A) a solid catalyst component containing a trivalent titanium compound, obtained by reducing a titanium compound represent by the general formula $Ti(OR^1)_nX_{4-n}$ (wherein $R^1$ is a hydrocarbon group of 1 to 20 carbon atoms, X is a halogen atom, and n is a number satisfying $0 < n \leq 4$) with an organomagnesium compound in the presence of an alcohol of 2 to 15 carbon atoms and/or a phenol of 6 to 15 carbon atoms to obtain a solid product and then treating the solid product with a mixture of a dialkyl ether and titanium tetrachloride, and
(B) an organoaluminum compound.

17. A catalyst system for olefin polymerization according to claim 16, wherein the organoaluminum compound (B) is a compound having at least one Al-C bond within the molecule and represented by the general formula $$R^{12}_\gamma AlY_{3-\gamma} \text{ or}$$

$$R^{13}R^{14}Al-O-AlR^{15}R^{16}$$

(wherein $R^{12}$, $R^{13}$, $R^{14}$, $R^{15}$ and $R^{16}$ are each a hydrocarbon group of 1 to 8 carbon atoms; Y is a halogen atom, a hydrogen atom or an alkoxy group; and $\gamma$ is a number of satisfying $2 \leq \gamma \leq 3$).

18. A catalyst system for olefin polymerization according to claim 17, wherein the organoaluminum compound is a trialkylaluminum, a mixture of a trialkylaluminum and a dialkylaluminum halide, or an alkyl alumoxane.

19. A catalyst system for olefin polymerization according to claim 16, wherein a mono- or polycarboxylic acid ester is added prior to or during the treatment of the solid product with the mixture of the dialkyl ether and titanium tetrachloride.

20. A catalyst system for olefin polymerization according to claim 19, wherein an electron-donating compound is added as a third component (C).

21. A catalyst system for olefin polymerization according to claim 20, wherein the electron-donating compound is an organic carboxylic-, phosphorouos-, or silicic-acid ester.

22. A catalyst system for olefin polymerization according to claim 16, 19, or 20, wherein a porous substance is coexisted in the reduction to obtain a solid product.

23. A catalyst system for olefin polymerization according to claim 22, wherein the porous substances are silica gel, alumina or porous polymer.

* * * * *